United States Patent
Won et al.

(10) Patent No.: US 9,973,976 B2
(45) Date of Patent: May 15, 2018

(54) EFFICIENT SESSION MANAGEMENT METHOD AND APPARATUS GUARANTEEING TERMINAL MOBILITY

(71) Applicant: Samsung Electronics Co., Ltd., Gyeonggi-do (KR)

(72) Inventors: Sung Hwan Won, Seoul (KR); Hwajin Cha, Gyeonggi-do (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 14/609,238

(22) Filed: Jan. 29, 2015

(65) Prior Publication Data

US 2015/0215822 A1  Jul. 30, 2015

(30) Foreign Application Priority Data

Jan. 29, 2014  (KR) ........................ 10-2014-0011725

(51) Int. Cl.
*H04W 36/00* (2009.01)
*H04W 36/30* (2009.01)
(Continued)

(52) U.S. Cl.
CPC ........ *H04W 36/0011* (2013.01); *H04W 36/00* (2013.01); *H04L 12/28* (2013.01); *H04W 36/16* (2013.01); *H04W 36/30* (2013.01)

(58) Field of Classification Search
CPC ............. H04W 36/0022; H04W 36/14; H04W 36/0011; H04W 36/0055; H04W 76/02;
(Continued)

(56) References Cited

U.S. PATENT DOCUMENTS

2009/0129342 A1  5/2009  Hwang et al.
2010/0202323 A1*  8/2010  Nishida ............. H04W 36/0016
                                                      370/254
(Continued)

FOREIGN PATENT DOCUMENTS

EP         2 665 308 A1   11/2013
WO     WO 2013/055173 A2   4/2013

OTHER PUBLICATIONS

International Search Report dated May 11, 2015 in connection with International Application No. PCT/KR2015/000935, 3 pages.
(Continued)

*Primary Examiner* — Jae Y Lee
*Assistant Examiner* — Aixa Guadalupe-Cruz

(57) ABSTRACT

A session management method and apparatus for managing mobility and session procedures integrally to improve manage the session of the terminal efficiently in the handover procedure. The session management method of a control entity includes transmitting a bearer management message for one of establishing, modifying, and releasing a bearer to a source base station, transmitting, when a handover of a terminal occurs before the bearer management is completed, a handover request including at least one of a first list including the bearers being managed by the source base station and a second list including the bearers being managed by the control entity to a target base station, and receiving a handover response from the target base station, wherein the handover response includes a bearer list generated based on one of the first and second list.

17 Claims, 9 Drawing Sheets

(51) Int. Cl.
*H04W 36/16* (2009.01)
*H04L 12/28* (2006.01)

(58) Field of Classification Search
CPC ..... H04W 36/12; H04W 36/08; H04W 80/04; H04W 76/06; H04W 36/0016; H04W 76/062; H04W 76/028; H04W 76/04; H04W 76/064; H04W 76/00
See application file for complete search history.

(56) References Cited

U.S. PATENT DOCUMENTS

| | | | |
|---|---|---|---|
| 2012/0076121 A1* | 3/2012 | Choi | ............ H04W 76/062 370/338 |
| 2012/0207129 A1 | 8/2012 | Sun | |
| 2013/0337812 A1 | 12/2013 | Pekonen et al. | |
| 2014/0003241 A1 | 1/2014 | Kim et al. | |
| 2014/0113637 A1 | 4/2014 | Guan et al. | |
| 2014/0242995 A1 | 8/2014 | Lee et al. | |

OTHER PUBLICATIONS

Samsung; "SRVCC Support Over S1"; 3GPP TSG-RAN WG3 Meeting #62; R3-083542; Prague, Czechia; Nov. 10-14, 2008; 26 pages.

"3rd Generation Partnership Project; Technical Specification Group Services and System Aspects; General Packet Radio Service (GPRS) Enhancements for Evolved Universal Terrestrial Radio Access Network (E-UTRAN) Access (Release 12)"; 3GPP TS 23.401 V12.3.0; Dec. 2013; 302 pages.

"3rd Generation Partnership Project; Technical Specification Group Radio Access Network; Evolved Universal Terrestrial Radio Access Network (E-UTRAN); S1 Application Protocol (S1AP) (Release 12)"; 3GPP TS 36.413 V12.0.0; Dec. 2013; 278 pages.

Foreign Communication from Related Counterpart Application; European Patent Application No. 15743147.9; Partial Supplementary European Search Report and Search Opinion dated Jul. 21, 2017; 7 pages.

* cited by examiner

EFFICIENT SESSION MANAGEMENT METHOD AND APPARATUS GUARANTEEING TERMINAL MOBILITY

CROSS-REFERENCE TO RELATED APPLICATION(S) AND CLAIM OF PRIORITY

The present application is related to and claims the benefit under 35 U.S.C. § 119(a) of a Korean patent application filed on Jan. 29, 2014 in the Korean Intellectual Property Office and assigned Serial No. 10-2014-0011725, the entire disclosure of which is hereby incorporated by reference.

TECHNICAL FIELD

The present application relates to a session management method and apparatus for use in a wireless communication system. In particular, the present application relates to a method and apparatus for managing mobility and session procedures integrally so as to manage the session of the terminal in the handover procedure efficiently.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

BACKGROUND

Mobile communication systems were developed to provide mobile users with communication services. With the rapid advance of technologies, the mobile communication systems have evolved to the level capable of providing high speed data communication service beyond the early voice-oriented services.

SUMMARY

To address the above-discussed deficiencies, it is a primary object to provide a method and apparatus for solving and mitigating the problems occurring when the mobility management procedure is triggered before the session management procedure of the terminal is completed. Also, embodiments of the present disclosure propose a method and apparatus for facilitating the mobility management procedure triggered in the middle of the session management procedure so as to prevent against connection failure of the terminal and perform the session management successfully.

In accordance with an aspect of the present disclosure, a session management method of a control entity is provided. The session management method includes transmitting a bearer management message for one of establishing, modifying, and releasing a bearer to a source base station, transmitting, when a handover of a terminal occurs before the bearer management is completed, a handover request including at least one of a first list including the bearers being managed by the source base station and a second list including the bearers being managed by the control entity to a target base station, and receiving a handover response from the target base station, wherein the handover response includes a bearer list generated based on one of the first and second list.

In accordance with another aspect of the present disclosure, a session management method of a target base station in handover of a terminal is provided. The session management method includes receiving a handover request including at least one of a first list including bearers being managed by the source base station and a second list including bearers being managed by a control entity from the control entity, generating a bearer list including bearers allowed for the handover and bearers for which securing resource has failed based on a bearer list generated based on one of the first and second lists, and transmitting the bearer list to the control entity.

In accordance with another aspect of the present disclosure, a session management method of a source base station in handover of a terminal. The session management method includes receiving a bearer management message for one of establishing, modifying, and releasing a bearer from a control entity and releasing, when a handover command is received before the bearer management is completed, bearers that are not included in the handover command.

In accordance with another aspect of the present disclosure, a control entity for performing session management is provided. The control entity includes a communication unit that is responsible for data communication and a control unit that controls the communication unit to transmit a bearer management message for one of establishing, modifying, and releasing a bearer to a source base station, transmit, when a handover of a terminal occurs before the bearer management is completed, a handover request including at least one of a first list including the bearers being managed by the source base station and a second list including the bearers being managed by the control entity to a target base station, and receive a handover response from the target base station, wherein the handover response includes a bearer list generated based on one of the first and second list.

In accordance with another aspect of the present disclosure, a target base station for managing a session in handover of a terminal is provided. The base station includes a communication unit that is responsible for data communication and a control unit that controls the communication unit to receive a handover request including at least one of a first list including bearers being managed by the source base station and a second list including bearers being managed by a control entity from a the control entity, generate a bearer list including bearers allowed for the handover and bearers for which a securing resource has failed based on a bearer list generated based on one of the first and second lists, and transmit the bearer list to the control entity.

In accordance with still another aspect of the present invention, a source base station for managing a session in handover of a terminal. The base station includes a communication unit that is responsible for data communication and a control unit that controls the communication unit to receive a bearer management message for one of: establishing, modifying, and releasing a bearer from a control entity and release, when a handover command is received before the bearer management is completed, bearers that are not included in the handover command.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

Although the description is directed to the 3rd Generation Partnership Project (3GPP) radio access network and Long Term Evolution (LTE) and Evolved Packet Core (EPC) as core network, it will be understood by those skilled in the art that the present invention can be applied even to other communication systems having the similar technical background and channel format, with a slight modification, without departing from the spirit and scope of the present disclosure.

Figure 1:
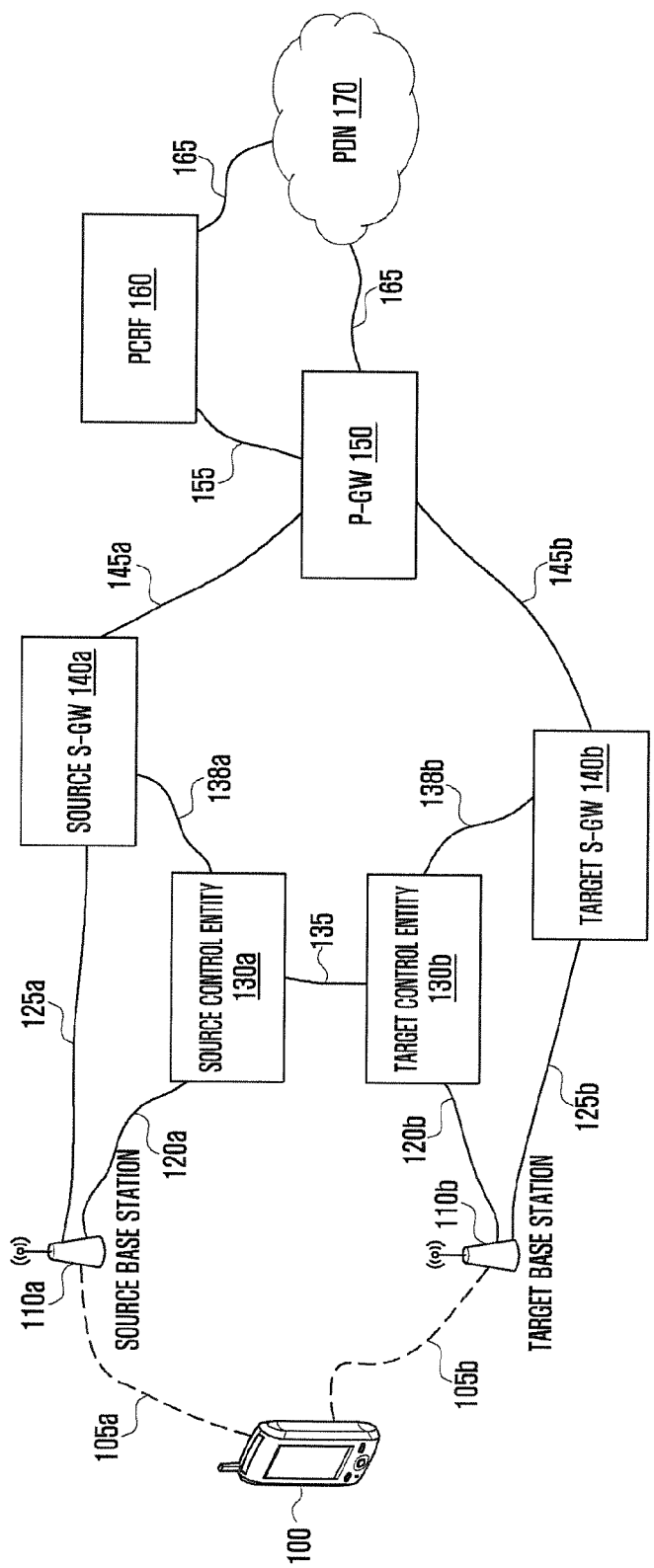
FIG. 1 illustrates a wireless communication system according to this disclosure.

FIG. 1 illustrates a wireless communication system according to this disclosure. The wireless communication system includes a terminal 100, source and target base stations 110a and 110b, source and target control entities 130a and 130b, source and target Serving Gateways (S-GWs) 140a and 140b, a Packet Data Network (PDN) Gateway (P-GW) 150, a Policy and Charging Rules Function (PCRF) 160, a Packet Data Network (PDN) 170, and interfaces 105, 120, 125, 135, 138, 145, 155, and 165 connecting the above components.

Although the same level network entities (e.g., the base stations 110a and 110b, control entities 130a and 130b, and S-GWs 140a and 140b) are paired in FIG. 1 to show that the terminal is mobile so as to be served by different base stations 110a and 110b, the terminal 100 is served by one base station at a time in general (under the assumption that the carrier aggregation and/or multipoint Coordinated Multi-Point transmission/reception technologies are not adopted).

The terminal 100 communicates user data and control data with the base station 110a (or 110b) through the radio interface 105. Here, the base station 110 can be any of an evolved Node B (eNB), a Node B (NB), a Radio Network Subsystem (RNS), a Base Transceiver Station (BTS), a Base Station Subsystem (BSS), and a wireless access point.

With some exception, the base station 110a (or 110b) can form at least one cell having a coverage area, and the terminal is served by the base station 110a (or 110b) within the coverage area. Here, the cell means the cell of a normal cellular system, and the base station 110a (or 110b) is a device which manages and controls the corresponding cell and, herein, the terms 'cell' and 'base station' are used interchangeably in the same meaning.

The control entity 130 is responsible for mobility and session management and authentication and security of the terminal 100, and the S-GWs 140a and 140b are works as anchor point in association with the user data transmission of the terminal 100. Examples of the control entity 130 include a Mobility Management Entity (MME) and a Serving General Packet Radio Service (GPRS) Support Node (SGSN). These entities are responsible for idle mode terminal paging and location management.

The user data of the terminal 100 can be classified into uplink user data and downlink user data. The uplink user data can be transmitted to the PDN 170 via the P-GW 150. The downlink user data can be received from the PDN 170 via the P-GW 150. The P-GW 150 and the PDN 170 are connected through a SGi interface.

The PCRF 160 is responsible for policy and charging decision and interoperates with the policy/charging execution function of the P-GW 150 so as to make the policy and charging decision.

FIG. 1 is directed to the case where the terminal 100 is connected to one PDN 170. The UE 100 can connect to multiple PDNs. In this case, although the terminal 100 has one user data anchor point, i.e. S-GW 140, the S-GW 140 can connect to one or more P-GWs.

The interfaces depicted in FIG. 1 can be summarized as shown in table 1.

TABLE 1

| Interface | Name | Transfer data type |
|---|---|---|
| 105 | Uu | Control and user data |
| 120 | S1-MME | Control data |
| 125 | S1-U | User data |
| 135 | S10 | Control data |
| 138 | S11 | Control data |
| 145 | S5/S8 | Control and user data |
| 155 | Gx | Control data |
| 165 | Rx | Control data |

In the above-described wireless communication system, the UE mobility management includes at least one of:
- a step for transferring the base station context pertaining to the terminal from the source base station 110a serving the terminal 100 to the target base station 110b suited for serving the terminal as the terminal roams.
- a step for collecting, at the source control entity 130a, the information on the target base station 110b of the terminal 100 and selecting, if necessary, the target control entity 130b capable of controlling the target base station 110b to transfer the control entity context pertaining to the terminal
- a step for selecting the S-GW suited for user data transfer Meanwhile, in the above-described wireless communication system, the terminal session management includes at least one of:
- a Terminal bearer resource modification request;
- a Bearer establishment/modification/release decision making at PCRF
- a Non-Access Stratum (NAS) bearer context creation/modification/release of control entity and terminal
- an Access Stratum (AS) bearer context creation/modification/release of control entity and terminal
- A bearer context creation/modification/release of base station and terminal Here, the bearer is a user data transmission path.

Figure 2:
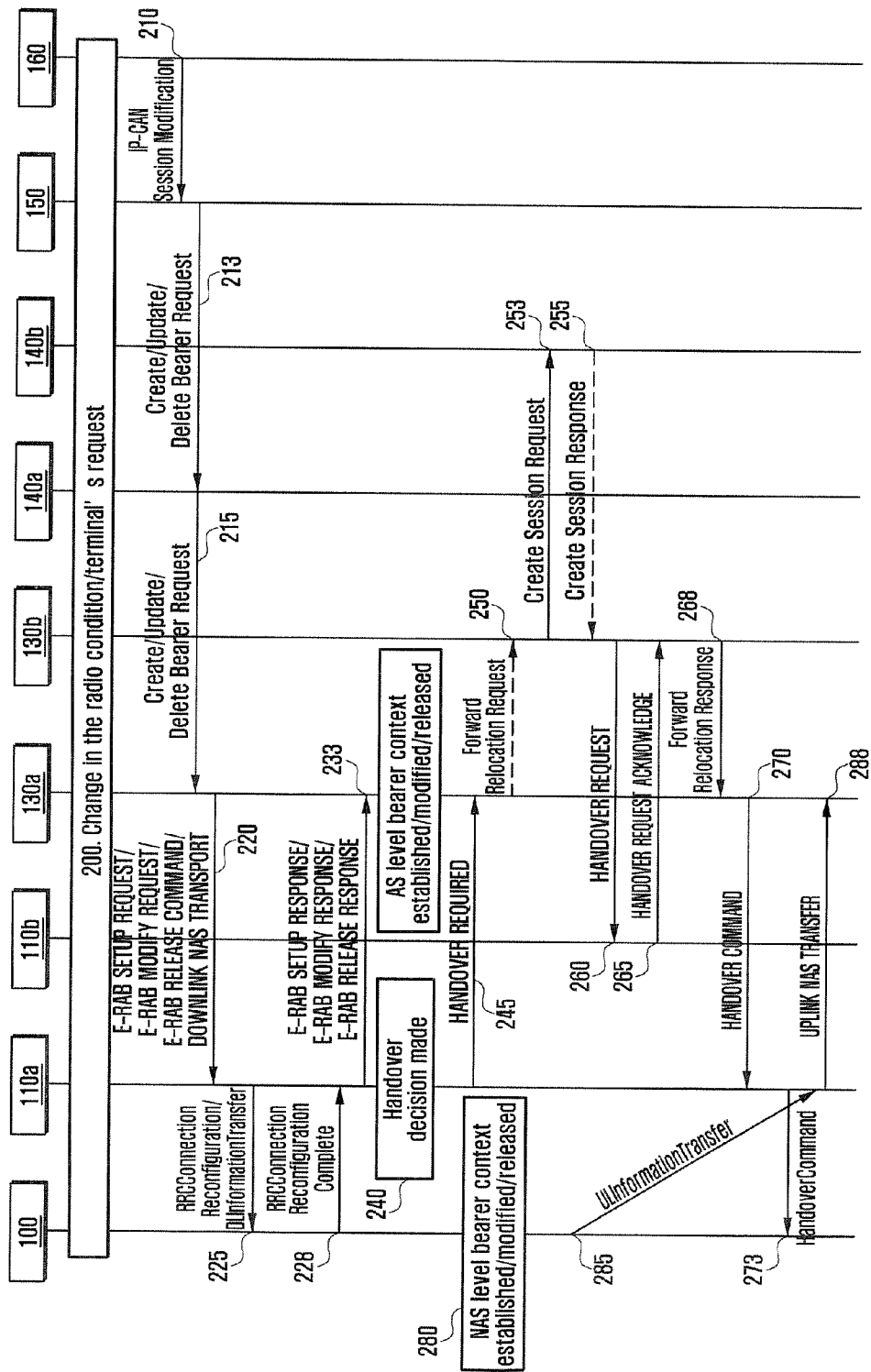
FIG. 2 illustrates a mobility management process in the course of the session management procedure.

FIG. 2 illustrates a mobility management process in the course of the session management procedure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

At step 200, the PCRF 160 detects the necessity of change in association with the bearer of the terminal 100. The necessity of change in association with the bearer of the terminal 100 is caused by one of the detection of change in the radio condition and terminal's request. If the radio condition change is detected, the source base station 110a sends the control entity 130a a message notifying of the release of the bearer (e.g. E-RAB RELEASE INDICATION message). The terminal's request for change in association with the bearer is transmitted to the control entity 130a using a NAS message. Examples of the NAS message include a Bearer Resource Allocation Request message and a Bearer Resource Modification Request message.

If a message is received from the source base station 110a, the source control entity 130a sends a message notifying of bearer management necessity to the PCRF 160 via the source S-GW 140a and the P-GW 150. The name and detailed structure of the message can be changed.

At step 210 the PCRF 160 triggers an IP-CAN Session Modification procedure. The P-GW 150 determines whether to establish a new bearer, modify the old bearer, or release the old bearer based on the information provided through the IP-CAN Session Modification procedure. The information transmitted by the PCRF 160 in the IP-CAN Session Modification procedure can be the Quality of Service (QoS) information.

Depending on the determination result, the P-GW 150 can transmit a Create Bearer Request message, an Update Bearer Request message, or a Delete Bearer Request message to the source control entity 130a via the source S-GW 140a.

At step 220, the source control entity 130a initiates a bearer management procedure to the source base station 110a. The bearer management procedure can be triggered by one of an E-RAB SETUP REQUEST message, an E-RAB MODIFY REQUEST message, an E-RAB RELEASE COMMAND message, and a DOWNLINK NAS TRANSPORT message. All of the enumerated messages include a NAS-PDU Information Element (IE) containing a NAS message to be delivered to the terminal 100.

The source base station 110a can perform an AS level bearer management depending on the received message. In the case that the E-RAB SETUP REQUEST message is received, the source base station 110a generates a new AS level bearer context based on the information contained in the message. The NAS message contained in the NAS-PDU IE of this message can be the Activate Default EPS Bearer Context Request message or the Activate Dedicated EPS Bearer Context Request message. In the case that the E-RAB MODIFY REQUEST message is received, the source base station 110a updates the old AS level bearer context based on the information contained in this message. The NAS message contained in the NAS-PDU IE of this message can be the Modify EPS Bearer Context Request message. In the case that the E-RAB RELEASE COMMAND message is received, the source base station 110a releases the old AS level bearer context based on the information contained in this message. The NAS message contained in the NAS-PDU IE of this message can be the Deactivate EPS Bearer Context Request message. In the case that the DOWNLINK NAS TRANSPORT message is received, the source base station 110a may not perform any operation in association with the AS level bearer context. The NAS message contained in the NAS-PDU IE of this message can be the Modify EPS Bearer Context Request message.

At step 225, the source base station 110a initiates a Radio Resource Control (RRC) Connection Reconfiguration procedure or simply transmits a NAS message to the terminal 100. The RRC Connection Reconfiguration procedure is triggered by transmitting the RRCConnectionReconfiguration message. The NAS message is carried in the DLInformationTransfer message. The NAS message also can be carried by the RRCConnectionReconfiguration message.

The terminal 100 can establish, modify, or release the AS level bearer context using the AS level bearer information of the RRCConnectionReconfiguration message, and transmit the RRCConnectionReconfigurationComplete message in reply. In such way, the AS level bearer context can be generated, modified, or released successfully for the terminal 100 and the source base station 110a. However, one of the terminal 100 and the source base station 110a can maintain the AS level bearer context during a predetermined period and then releases to prepare for a potential situation.

If the DOWNLINK NAS TRANSPORT message is received at step 220, the DLInformationTransfer message can be delivered at step 225, and the message transmitted at step 228 and/or step 233 may be omitted.

If the RRCConnectionReconfigurationComplete message is received from the terminal 100, the source base station 110s can send a message notifying that the AS level context has been established, modified, or released successfully. This message can be one of the E-RAB SETUP RESPONSE message, E-RAB MODIFY RESPONSE message, and E-RAB RELEASE RESPONSE message.

Through the above procedure, the AS level bearer context of the control entity 235 can be established, modified, or released successfully at step 235. However, since a response is not transmitted in response to the NAS message from the terminal 100 yet, the NAS level bearer context-related procedure is not completed.

At this time, the source base station 110a can make a handover decision to hand over the terminal 100 to the target base station 110b for mobility of the terminal or other reasons at step 240. The source base station 110a can send a handover trigger message to the source control entity 130a. The handover trigger message can be the HANDOVER REQUIRED message. This message can include the Source to Target Transparent Container IE. This IE can contain the information on the bearer which the base station 110a retains. Here, the bearer information can be of the bearer of which AS level bearer context is retained by the source base station 110a.

The source control entity 130a can determine whether it is preferred for the target control entity 130b to manage the terminal 100 based on the information of the target base station 110b after receiving the handover trigger message. If it is determined for the source control entity 130a to continue managing the terminal 100, steps 250 and 268 may be omitted. If it is determined for the target control entity 130b to manage the terminal 100, the source control entity 130a can send the target control entity 130b at least one of the retained context of the terminal 100 and Source to Target Transparent Container IE.

If it is determined to use the old control entity 130a, the target control entity 130b determines whether to continue using the source S-GW 130a or the target S-GW 140b. If it is determined to use the target S-GW 140b, the target control entity 130b exchanges the Create Session Request message and Create Session Response message with the target S-GW 140b to collect the uplink Tunnel End Point Identifier (TEID) of the target S-GW per bearer.

At step 260, the target control entity 130b sends the target base station 110b a message requesting for handover. This message can be HANDOVER REQUEST message. The control message can include the E-RAB to be Setup List IE and the Source to Target Transparent Container IE. The E-RAB to be Setup List IE can be generated based on the bearer context stored in the target control entity 130b. Since the bearer may have not been established/modified/released completely in view of the NAS level bearer context, although it has been established/modified/released completely in view of the AS level bearer context, the "bearer list contained in E-RAB to be Setup List IE" may not match the "bearer list contained in the Source to Target Transparent Container IE containing the bearers in view of the AS level bearer context" In the case of modifying the bearer, it is not to establish or deletes a bearer, the list may match each other.

If the bearer lists mismatch, the target base station 110b determines this as an error situation so as to reject the handover request. This causes handover failure and, if the handover is not performed in due time, this can cause the problem of increasing the connection failure probability of the terminal 100.

Even when the bearer lists mismatch occurs, the target base station 110b can accept the handover. In this case, the target base station 110b sends the target control entity 130b a HANDOVER REQUEST ACKNOWLEDGEMENT message at step 265. At this time, the target base station 110b sends the target control entity 130b at least one of the bearer list allowed for accept handover in the target base station 110b, a setup-failed bearer list, and a Target to Source Transparent Container IE.

In the case that the control entity is changed, the target control entity 130b sends the source control entity a Forward Relocation Response message including the whole or part of the information contained in the HANDOVER REQUEST ACKNOWLEDGE at step 268.

At step 270, the source control entity sends the source base station 110a a HANDOVER COMMAND message. This message can contain at least one of E-RABs Subject to Forwarding List IE and E-RABs to Release List IE. The union of the bearer lists included in the two IEs is the information on the bearers on which handover is allowed (E-RABs Subject to Forwarding List IE) or not allowed (E-RABs to Release List IE) in the target base station 110b based on the bearer list of the control entity and thus can differ from the bearer list that can be obtained from the AS level bearer context information retained by the source base station 110a. The source base station 110a regards this as an erroneous situation and handles the handover preparation process as an error. As a consequence, if the handover fails and does not succeed in due time, the connection failure probability of the terminal increases.

The HANDOVER COMMAND message can further include a Target to Source Transparent Container IE. Typically, the source base station 110a does not decode this IE.

In spite of the bearer list mismatch, the source base station 110a can continue the handover procedure. In this case, the source base station 110a sends the terminal 100 a HandoverCommand message at step 273. The HandoverCommand message can carry the information contained in the received Target to Source Transparent Container IE as it is.

The terminal 100 establishes/modifies/releases the NAS level bearer context to at step 228 and sends a response in reply to the received NAS message. The response can be transmitted through the ULInformationTransfer message which includes at least one of the following NAS messages: Activate Dedicated EPS Bearer Context Accept message, Activate Default EPS Bearer Context Accept message, Deactivate EPS Bearer Context Accept message, and Modify EPS Bearer Context Accept message. The NAS message can be transmitted to the control entity 130a through the UPLINK NAS TRANSFER message at step 288.

There is a risk that an error can occur in the handover procedure and thus the handover fails but, although all of the risk elements are overcome, the bearer contexts of target base station 110b and {source base station 110a and terminal 100} can mismatch. Table 2 shows such difference.

TABLE 2

| Bearer management | Target base station (110b) | Source base station (110a) and terminal (100) |
|---|---|---|
| Establish | Non-establish | Establish |
| Modify | Non-modify | Modify |
| Release | Non-release | Release |

Depending upon the implementation, that is, depending upon how to process the bearer management procedure following the receipt of the HANDOVER REQUIRED message, the control entity can retain the bearer context or not. For example, If the control entity is configured to abort, when the HANODVER REQUIRED message is received in the middle of establishing a bearer, the bearer establishment, the corresponding bearer context is absent in the control entity. If the control entity does not stop establishing the bearer and determines the UPLINK NAS TRANSFER message reception result of step 288, the corresponding bearer context can be established after step 288.

In the current bearer management and handover procedure, if the handover is triggered in the course of the bearer management, the handover fails or bearer context mismatch occurs so as to cause problems in bearer management.

Due to the trend of an increasing number of small base stations, the handover occurs more frequently. Also, with the popularization of the Voice over LTE (VoLTE) service, the bearer management becomes more complex. By taking notice of such trend in the wireless communication system, the problems exposed in the course of describing the procedure with reference to FIG. 2 is becoming significant more and more.

The present disclosure provides a method and apparatus for solving and mitigating the problems occurring when the mobility management procedure triggered without completion of the session management procedure of the terminal.

In the present disclosure, the problem pertaining to the bearer establishment/modification/release that is occurring when the mobility management procedure is triggered without completion of the session management procedure of the terminal is decomposed provide solution per case. In the present disclosure, "establish" is interchangeable with term "generate."

Bearer Establishment

Figure 3:
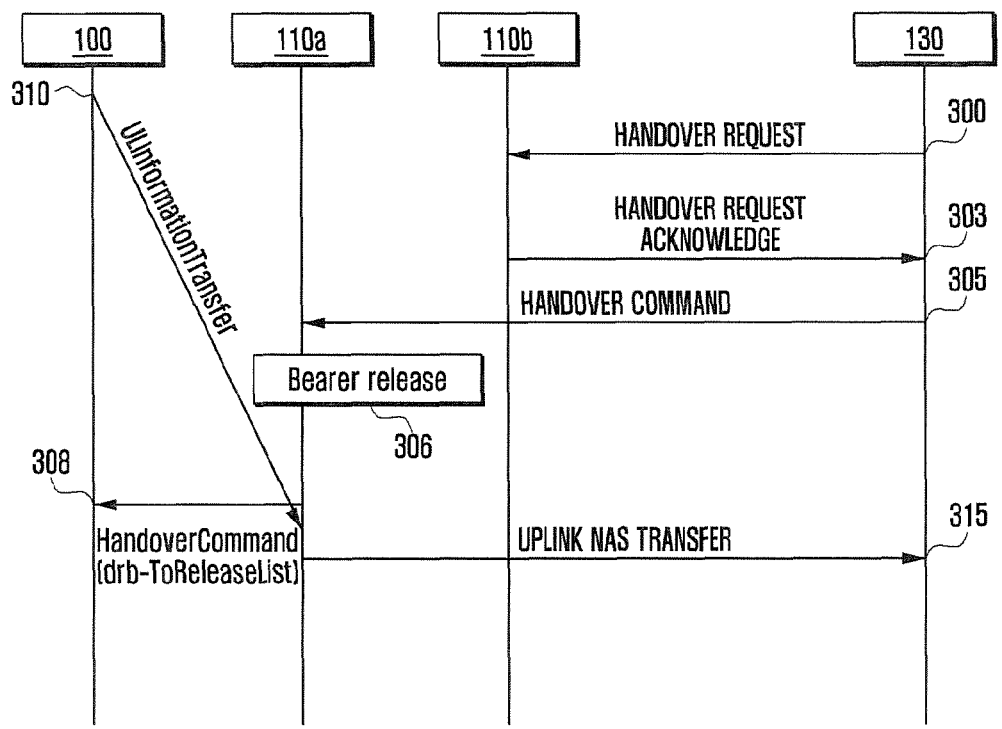
FIG. 3 illustrates a handover procedure according to embodiments of the present disclosure.

FIG. 3 illustrates a handover procedure according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

According to certain embodiments of the present disclosure, the target base station 110b compares the bearer lists transmitted by the source base station 110a and the control element 130 to each other to secure the bearer resource based on the list transmitted by the control entity 130 and control the message to be transmitted to the terminal thereon via the touch base station 110a, thereby solving the bearer context mismatch.

FIG. 3 shows the operations subsequent to step 255 of FIG. 2 in association with bearer establishment.

The control entity 130 sends the target base station 110b a message requesting for handover at step 300. This message can be the HANDOVER REQUEST message. This message can include at least one of a bearer list transmitted by the control entity 130 and a bearer list transmitted in a container by the source base station 110a. For example, the HANDOVER REQUEST message can include the E-RABs To Be Setup List IE containing the bearer list transmitted by the control entity 130 and the E-RABs Information List IE containing the bearer list transmitted in the Source to Target Transparent Contained by the source base station 110a.

Since the bearer is in the middle of being established, the bearer list transmitted by the control entity 130 can be part of the bearer list transmitted in the container by the source base station 110a. In this case, the target base station 110b can secure the source based on the bearer list transmitted by the control entity 130.

At step 303, the target base station 110b sends the control entity 130 a response message in reply to the handover request. The response message can be the HANDOVER REQUEST ACKNOWLEDGE message. The message can include at least one of a handover-allowed bearer list and a resource-securing failed bearer list of the target base station 110b. The handover-allowed bearer list can be represented by the E-RABs Admitted List IE and the resource-securing failed bearer list by the E-RABs Failed to Setup List IE in the HANDOVER REQUEST ACKNOWLEDGE message.

The target base station 110b includes the handover allowed bearers, which are contained in the bearer list transmitted by the control entity 130, in the handover allowed bearer list of the target base station 110b, and includes the resource-securing failed bearers, which are contained in the bearer list transmitted by the control entity 130, in the resource-securing failed bearer list of the target base station 110b.

The response message transmitted in reply to the handover request can include a handover command message to be transmitted from the source base station 110a to the terminal 100 afterward (e.g. at step 308). The handover command message can be transmitted in the Target to Source Transparent Container IE. The source base station 110a can send the terminal 100 a list of the bearers, which the terminal has to release, in the handover command message. The list of the bearers to be released by the terminal can include a bearer, which exists in the bearer list transmitted in the container by the source base station 110a, but not in the bearer list transmitted by the control entity 130.

The list of the bearers which the terminal has to release can be transmitted directly or indirectly as follows:
  Including the list of the bearers to be released in drb-ToReleaseList.
  Excluding the list of the bearers to be released from drb-ToAddModList.

The second example is useful when the full configuration is applied.

At step 305, the control entity 130 sends the source base station 110a a message indicating successful handover preparation. This message can be the HANDOVER COMMAND message. This message can include at least one of a forward bearer list and a release bearer list. In the case of the HANDOVER COMMAND message, the forward bearer list corresponds to E-RABs Subject to Forwarding List IE, and the release bearer list corresponds to E-RABs to Release List IE.

At step 306, if a bearer that is not released but under management is included in neither the forward bearer list nor the release bearer list contained in the received message, the source base station 110a can release the corresponding bearer. The non-released bearer list can be the bearer list contained in the Source to Target Transparent Container IE by the source base station 110a.

At step 308, the source base station 110a sends the terminal 100 a message commanding handover. This message can be the Source to Target Transparent Container IE message. This message can be transmitted in a container to the target base station 110b. If the target base station 110b has transmitted a list of bearers that the terminal 100 has to release through the HandoverCommand message, the terminal 100 can release the bearers contained in the list at both the AS and NAS levels.

Meanwhile, the terminal 100 sends the source base station 110a a NAS message notifying of successful NAS level bearer context creation at step 310. This NAS message can be the Activate Dedicated EPS Bearer Context Accept message or the Activate Default EPS Bearer Context Accept message. This NAS message can be sent to the source base station 110a through the ULInformationTransfer message and then then source base station 110a forwards this NAS message to the control entity 130 through the UPLINK NAS TRANSFER message at step 315. The control entity 130 may ignore this NAS message.

Through the above procedure, it is possible to complete the handover preparation procedure successfully so as to overcome the bearer mismatch problem (by releasing all the bearer contexts). Since the bearer to be established is not established actually, this procedure can be followed an extra bearer establishment procedure.

Other alternative embodiments can be considered. At step 300, the target base station 110b can secure the bearer-related resource based on the list transmitted by the source base station 110a and notify the control entity 130 of the result at step 303. At this time, it is necessary to establish a bearer context to the base station 110b. Since the conventional bearer information which the source base station 110a transmits through the Source to Target Transparent Container IE does not include the bearer TEID and/or QoS, the source base station 110a can add the information necessary for establishing bearer context to the Source to Target Transparent Container IE. The information necessary for establishing bearer context can include at least one of the bearer TEID and QoS. If the Source to Target Transparent Container IE is received, the target base station 110b can establish the bearer context based on the IE.

Bearer Modification

Figure 4A:
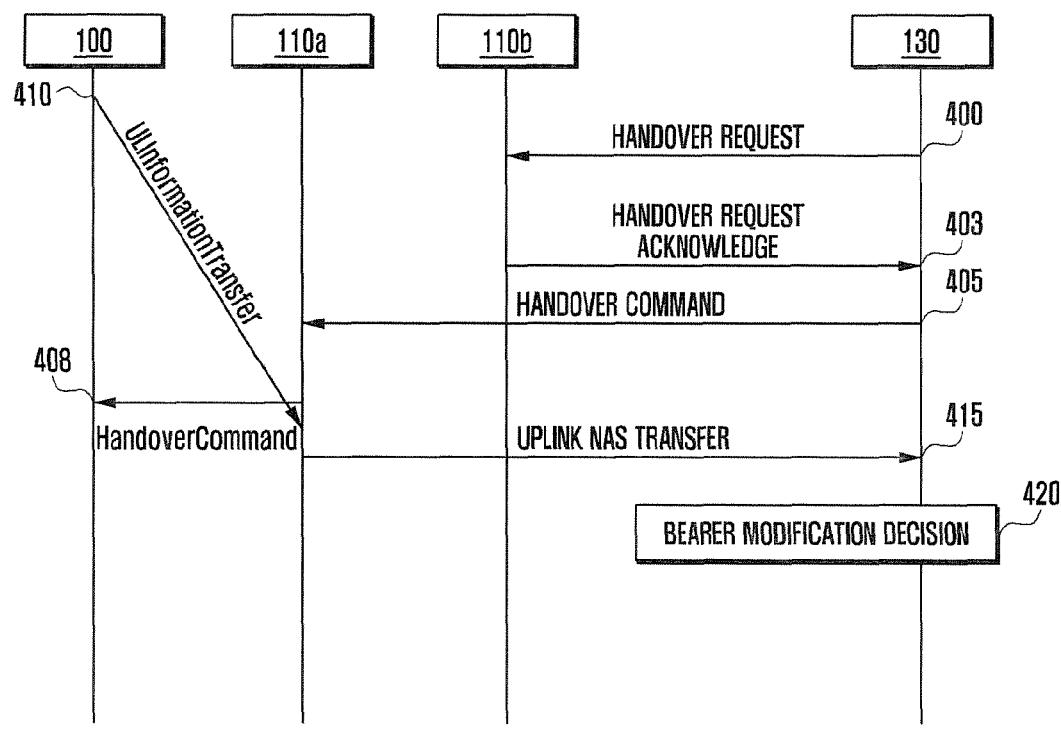
FIG. 4a illustrates a handover procedure according to embodiments of the present disclosure.

FIG. 4a illustrates a handover procedure according to embodiments of the present disclosure.

According to certain embodiments of the present disclosure, the control entity 130 can determine whether to further perform a bearer modification procedure depending on the AS level bearer modification message has been transmitted to the source base station 110a.

FIG. 4a shows the operation subsequent to step 255 of FIG. 2 in association with bearer modification. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

At step 400, the control entity 130 sends a message requesting for handover to the target base station 110b. This message can be the HANDOVER REQUEST message. This message can include at least one of per-bearer QoS information and Aggregate Maximum Bit Rate (AMBR) of the terminal 100. Since the bearer modification is not completed at the control entity 130, the information can different from the recent information reflected to the source base station 110a. In the case of modifying the NAS level information with the exception of QoS, however, there is nothing to be reflected to base station 10 and thus there may not be difference between the information and the recent information (the AMBR information of the terminal 100 can be changed).

The target base station 110b can transmit a response in reply to the handover request at step 403. The response message can be the HANDOVER REQUEST ACKNOWLEDGE message. The control entity 130 sends the source base station 110a a message informing of successful handover preparation at step 405. The source base station 110a sends the terminal 100 a message commanding handover at step 408. This message can be the HandoverCommand message.

Meanwhile, the terminal 100 can send the source base station 110a a NAS message notifying that the NAS level bearer context is established successfully at step 410. The NAS message can be the Modify EPS Bearer Context Accept message. The NAS message can be sent to the source base station 110a through the ULInformationTransfer message and then the source base station forwards the NAS message to the control entity 130 through the UPLINK NAS TRANSFER message at step 415.

At step 420, the control entity 130 can determine whether to restart the bearer modification procedure depending on the type of the bearer modification procedure. This determination step is described in detail with reference to FIG. 4b.

According to the above procedure, the control entity 130 is capable of reducing the signaling traffic by skipping the bearer modification procedure when there is no need of modifying the bearer context of the base station 110*b*.

Figure 4B:
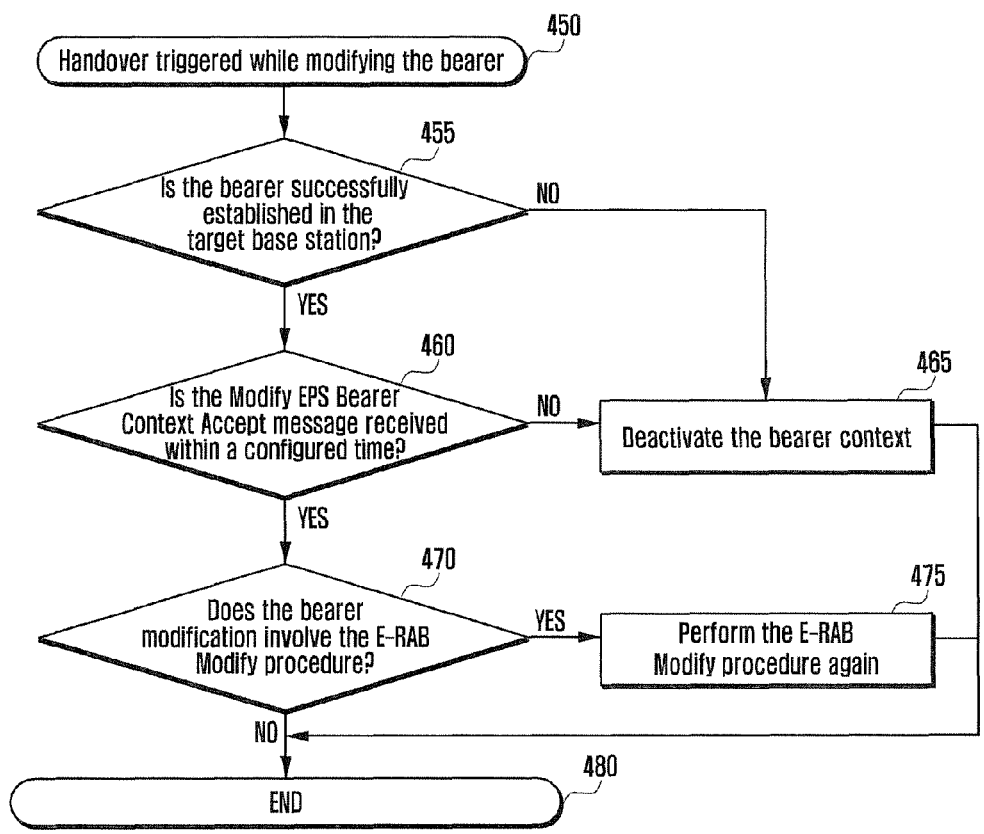
FIG. 4b illustrates the operation of the control entity according to embodiments of the present disclosure.

FIG. 4*b* illustrates the operation of the control entity according to certain embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

According to the above-described procedure, a handover is triggered while modifying the bearer at step 450.

The control entity 130 determines whether the bearer for modification is established successfully at the target base station 110*a* at step 455. If the bearer is established successfully, the procedure goes to step 460 and, otherwise, step 465.

At step 460, the control entity 130 determines whether the Modify EPS Bearer Context Accept message notifying of the successful bearer modification is received from the terminal 100 within in configured time. If this message is received, the procedure goes to step 470 and, otherwise, step 465.

At step 465, the control entity 130 releases the modified bearer context and then the procedure goes to step 480.

At step 470, the control entity 130 determines whether the E-RAB Modify procedure has been performed to the bearer being modified. If the E-RAB Modify procedure has been performed, the procedure goes to step 475 and, otherwise, step 480. If the E-RAB Modify procedure has been performed, this means that there is a modification in QoS of the bearer.

At step 475, the control entity 130 performs the E-RAB Modify procedure once more for the bearer being modified.

Afterward, the control entity 130 ends the procedure at step 480.

Bearer Release

Figure 5:
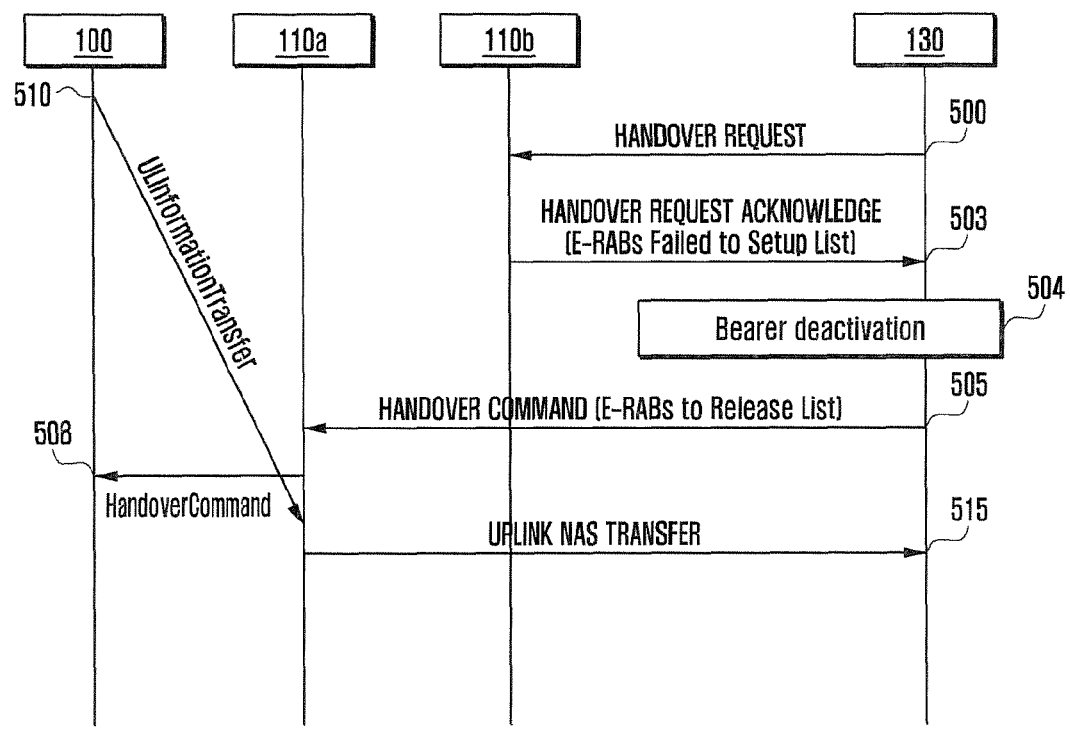
FIG. 5 illustrates a handover procedure according to embodiments of the present disclosure.

FIG. 5 illustrates a handover procedure according to certain embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

According to certain embodiments of the present disclosure, the target base station 110*b* compares the bearer lists transmitted by the source base station 110*a* and the control entity 130 to each other, secures the bearer resource based on the list transmitted by the source base station 110*a*, and sends the control entity 130 a list of the bearer to be released such that the control entity 130 releases the corresponding bearers, thereby resolving the bearer context mismatch.

FIG. 5 shows the operation subsequent to step 255 of FIG. 2 in association with bearer release.

At step 500, the control entity 130 sends a message requesting for handover to the target base station 110*b*. This message can be the HANDOVER REQUEST message. This message can include at least one of the bearer list transmitted by the control entity 130 and the bearer list transmitted in a contained by the source base station 110*a*. For example, the HANDOVER REQUEST message can be includes the bearer list transmitted by the control entity 130 in the form of E-RABs To Be Setup List IE and the bearer list transmitted in the Source to Target Transparent Container by the source base station 110*a* in the form of E-RABs Information List IE.

Since the bearer is in the middle of being established, the bearer list transmitted in the container by the source base station 110*a* can be part of the bearer list transmitted by the control entity 130. In this case, the target base station 110*b* can secure the source based on the bearer list transmitted by the control entity 130. In this case, the target base station 110*b* can secure the resource based on the bearer list transmitted by the source base station 110*a*.

At step 503, the target base station 110*b* transmits a response message in reply to the handover request. The response message can be THE HANDOVER REQUEST ACKNOWLEDGE message. This message can include at least one of a handover-allowed bearer list and a resource-securing failed bearer list of the target base station 110*b*. The handover-allowed bearer list can be represented by the E-RABs Admitted List IE and the resource-securing failed bearer list by the E-RABs Failed to Setup List IE in the HANDOVER REQUEST ACKNOWLEDGE message.

The target base station 110*b* includes the handover allowed bearers, which are contained in the bearer list transmitted by the control entity 130, in the handover-allowed bearer list of the target base station 110*b*, and includes the resource-securing failed bearers, which are contained in the bearer list transmitted by the control entity 130, in the resource-securing failed bearer list of the target base station 110*b*. The bearer list is included in the message of step 500. In addition, the resource-securing failed bearer list can include a bearer, which exists in the bearer list transmitted in the container by the source base station 110*a* but not in the bearer list transmitted by the control entity 130.

The response message in reply to the handover request can include the handover command message to be transmitted from the source base station 110*a* to the terminal afterward (at step 508). The handover command message can be contained in the Target to Source Transparent Container IE. The source base station 110*a* can send the terminal 110 a list of bearers which the terminal 100 has to releases through the handover command message. It is not mandatory that the list of the bearer to be released has to include all the bearers listed in the resource-securing failed bearer list. For example, the bearer, which exists in the bearer list transmitted by the control entity 130 but not in the bearer list transmitted in the container by the source base station 110*a* may not be included in the release bearer list.

At step 504, the control entity 130 can release the bearers included in the resource-securing failed bearer list.

At step 305, the control entity 130 sends the source base station 110*a* a message indicating successful handover preparation. This message can be the HANDOVER COMMAND message. This message can include at least one of a forward bearer list and a release bearer list. In the case of the HANDOVER COMMAND message, the forward bearer list corresponds to E-RABs Subject to Forwarding List IE, and the release bearer list corresponds to E-RABs to Release List IE. Here, the release bearer list can include the bearer which exists in the bearer list transmitted by the control entity 130 but not in the bearer list transmitted in the container by the source base station 110*a*. In this case, although the information instructing to release the bearer which is not managed (released already) is received (using the release bearer list), the source base station 110*a* can ignore this information.

At step 508, the source base station 110*a* sends the terminal 100 a message commanding handover. This message can be the Source to Target Transparent Container IE message.

Meanwhile, the terminal 100 sends the source base station 110*a* a NAS message notifying of successful NAS level bearer context creation at step 310. This NAS message can be the Activate Dedicated EPS Bearer Context Accept message This NAS message can be sent to the source base station 110*a* through the ULInformationTransfer message and then then source base station 110*a* forwards this NAS message to the control entity 130 through the UPLINK NAS TRANSFER message at step 515. The control entity 130 can ignore this NAS message.

Through the above procedure, it is possible to complete the handover preparation procedure successfully so as to overcome the bearer mismatch problem (by releasing all the bearer contexts). Since the bearer to be released is released successfully, there can be no need of performing an additional bearer release procedure.

Figure 6A:
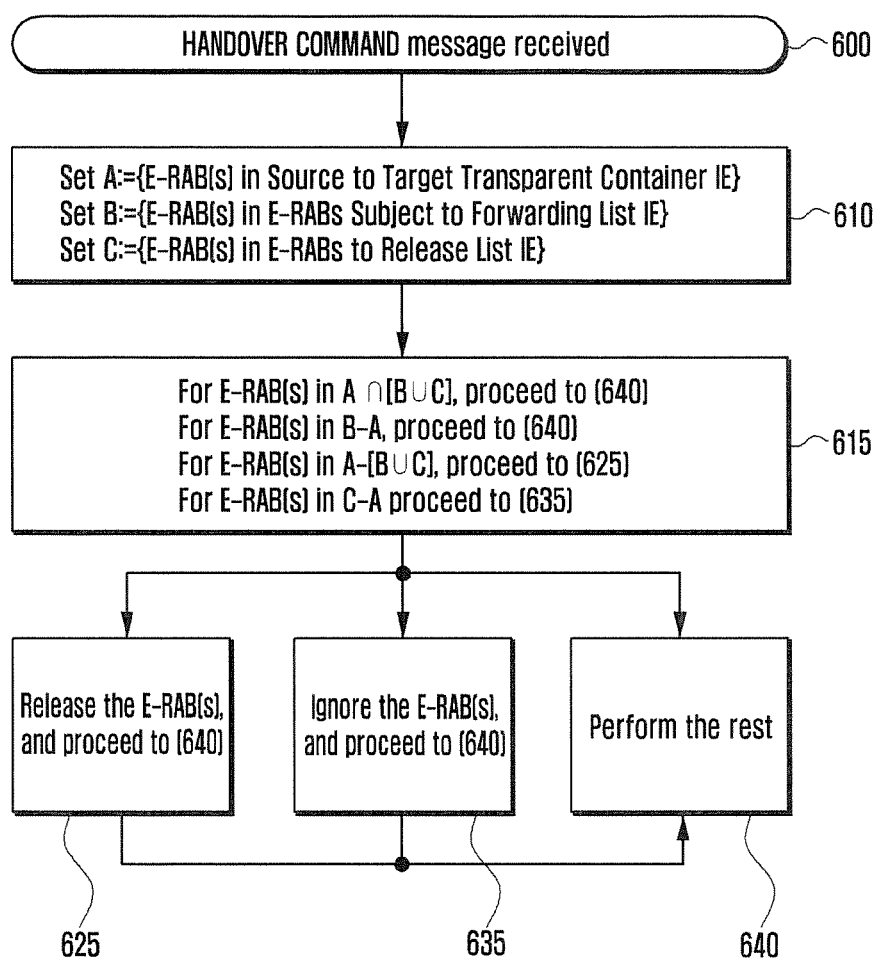
FIG. 6a illustrates a handover procedure of the source base station according to embodiments of the present disclosure.

FIG. 6*a* illustrates a handover procedure of the source base station according to certain embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

For convenience purpose, it is assumed that set A is a set of bearers that is included in the Source to Target Transparent Container IE or a set of bearers activated at the base station 110*a*, set B is a set of bearers that is included in the E-RABs Subject to Forwarding List IE or a set of bearers accepted by the target base station 110*b*, and set C is a set of the bearers that is included in the E-RABs to Release List IE or a set of bearers to be released by the target base station 110*b* at step 610.

At step 615, the bearers are handled as follows:
Intersection between [union of B and C] and A: bearers that are managed by the source and target base stations 110*a* and 110*b* (although determined not to be accepted by the target base station 110*b*). The means by which the bearers included in this set are handled is described at step 640.
A Difference set of A to B: bearers established due to an erroneous operation. How the bearers included in this set are handled is described at step 640.
A [union of B and C] to A: bearers that are not recognized by the target base station 110*b*. The means by which the bearers included in this set are handled is described at step 625.
A Difference set of A to C: bearers supposed to be released at the source base station 110*a*. The means by which the bearers included in this set are handled is described at step 635.

The source base station 110*a* releases the corresponding bearer at set 625. The procedure goes to step 640.

The source base station 110*a* ignores the corresponding bearer at step 635. The source base station 110*a* may not further process the corresponding bearer. The procedure goes to step 640.

The source base station 110*a* performs a normal bearer management operation at step 640. If it is determined that the bearer is established by an erroneous operation, the source base station 110*a* can perform error handling or releases the bearers not allowed by the target base station 110*b*.

Figure 6B:
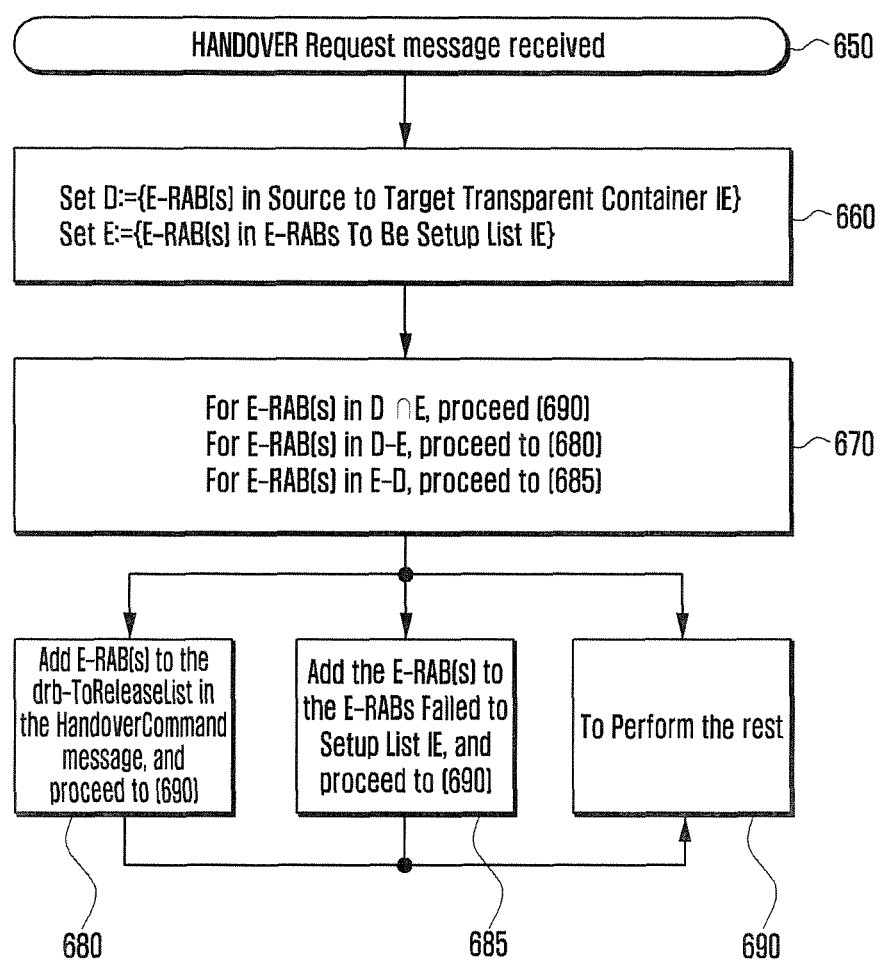
FIG. 6b illustrates handover procedure of the target base station 110b according to embodiments of the present disclosure.

FIG. 6*b* is a flowchart illustrates handover procedure of the target base station 110*b* according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

At step 600, the target base station 110*b* receives the HANDOVER REQUEST message.

For convenience purpose, it is assumed that set D is a set of bearers which is included in the Source to Target Transparent Container IE or a set of bearers activated at the base station 110*a*, set E is a set of bearers which is included in the E-RABs To Be Setup List IE or a set of bearers to be established by the control entity 130 at step 660.

At step 670, the bearers are handled as follows.
Intersection between D and E: bearers managed appropriately by the source base station 110*a* and the control entity 130. The means by which the bearers included in this set are handled is described at step 690.
Difference set of E to D: bearers that are not established completely. The means by which the bearers included in this set are handled is described at step 680.
Difference set of D to E: bearers that are not established completely. The means by which the bearers included in this set are handled is described at step 685.

At step 680, the target base station 110*b* can have the terminal 100 releases the corresponding bearer afterward using a way of including the corresponding bearer in the drb-ToReleaseList of the HandoverCommand or, in the case of applying the full configuration, excluding the corresponding bearer from the drb-ToAddModList. Other bearer resources can be managed based on E. The procedure goes to step 690.

At step 685, the target base station 110*b* adds the corresponding bearer to the E-RABs Failed to Setup List IE or a bearer list notifying of bearer resource-securing failure. Other bearer resources can be managed based on E. The procedure goes to step 690.

At step 690, the target base station 110*b* performs the normal bearer management operation.

Figure 7:
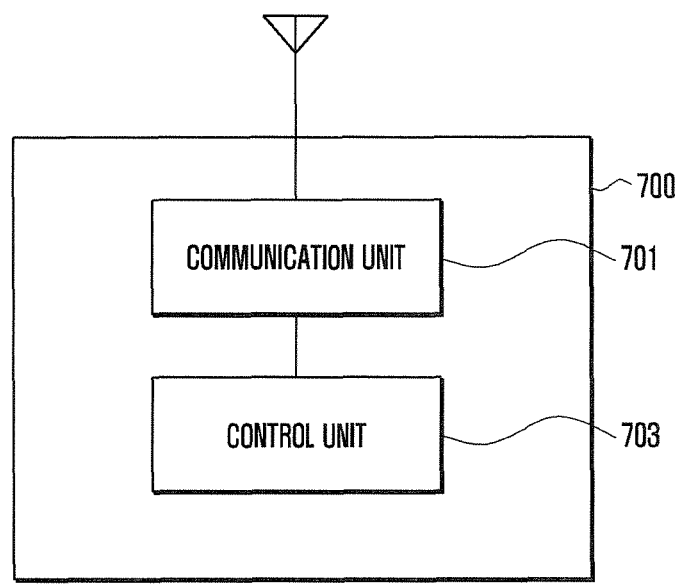
FIG. 7 illustrates a configuration of a device according to embodiments of the present disclosure.

FIG. 7 illustrates a configuration of a device according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In FIG. 7, examples of the entity device includes a terminal, a base station, a control entity, an S-GW, and a P-GW.

According to certain embodiments of the present disclosure, the entity 700 includes a communication unit 701 and a control unit 703.

The communication unit 701 is responsible for data communication with other devices under the control of the control unit 703.

The control unit 703 controls the components including the communication unit 701 to perform the operation according to an embodiment of the present disclosure. The control unit 703 operates as described above.

As described above, the method and apparatus for information exchange among the terminal, the base stations, and the control entities for use in the wireless communication system according to the present disclosure is advantageous in terms of improving the user's quality of experience by reducing the connection failure caused by the session management failure and mobility management failure through integrated management of mobility and session.

In the above-described embodiments, all the steps and messages can be used optionally or omitted. In each embodiment, it is not necessary for the steps to be performed in sequence but in different orders. Also, it is not necessary for the messages to be transferred in sequence but in different orders.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A session management method of a control entity, the method comprising:
   transmitting, to a source base station, a bearer management message for one of establishing, modifying, and releasing a bearer;
   receiving, from the source base station, a handover required message including a first list for bearers in the source base station for a terminal;
   transmitting, to a target base station, a handover request including the first list for the bearers and a second list for bearers in the control entity for the terminal, when a handover of a terminal occurs before a bearer management associated with the bearer management message is completed; and
   receiving, from the target base station,
   a handover response including a bearer list generated based on one of the first list and the second list.

2. The method of claim 1, wherein the bearer list is generated based on the bearers included in the second list when the bearer management message transmitted to the source base station is a bearer establishment message.

3. The method of claim 1, further comprising performing, when the bearer management message transmitted to the source base station is a bearer modification message, bearer modification according to type of the bearer modification.

4. The method of claim 3, wherein performing bearer modification comprises:
   determining whether the target base station has complete the bearer modification;
   determining, when the target base station has completed the bearer modification, whether a Non-Access Stratum (NAS) message is received;
   deleting, when the target base station has not completed the bearer modification or the NAS message is not received, a bearer context associated with the bearer modification;
   determining, when the NAS message has been received, whether the bearer modification includes Quality of Service (QoS) modification; and
   re-performing, when the bearer modification includes the QoS modification, the bearer modification.

5. The method of claim 1, wherein the bearer list is generated based on the bearers included in the first list when the bearer management message transmitted to the source base station is a bearer release message.

6. The method of claim 5, further comprising releasing the bearers included in a list of bearers for which the target base station has failed securing resources among the bearers included in the bearer list.

7. A session management method of a target base station in handover of a terminal, the method comprising:
   receiving, from a control entity, a handover request including a first list for bearers in a source base station for the terminal and a second list for bearers in the control entity for the terminal, when a handover of a terminal occurs before a bearer management is completed;
   generating a bearer list for bearers allowed for the handover and bearers for which securing resource has failed based on one of the first list and the second list; and
   transmitting the bearer list to the control entity.

8. The method of claim 7, wherein generating the bearer list comprises:
   generating, when the second list corresponds to part of the first list, the bearer list based on the second list; and
   generating, when the first list corresponds to part of the second list, the bearer list based on the first list.

9. A session management method of a source base station in handover of a terminal, the method comprising:
   receiving, from a control entity, a bearer management message for one of establishing, modifying, and releasing a bearer; and
   releasing, when a handover command is received before a bearer management associated with the bearer management message is completed, bearers that are not included in the handover command.

10. A control entity for performing session management, the control entity comprising:
    a transceiver configured transmit and receive signals; and
    a processor configured to control the transceiver to:
      transmit, to a source base station, a bearer management message for one of establishing, modifying, and releasing a bearer,
      receive, from the source base station, a handover required message including a first list for bearers in the source base station for a terminal,
      transmit, to a target base station, a handover request including the first list for bearers and a second list for bearers in the control entity for the terminal, when a handover of a terminal occurs before a bearer management associated with the bearer management message is completed, and
      receive, from the target base station,
    a handover response including a bearer list generated based on one of a first list and a second list.

11. The control entity of claim 10, wherein the bearer list is generated based on the bearers included in the second list when the bearer management message transmitted to the source base station is a bearer establishment message.

12. The control entity of claim 10, wherein the processor is configured to perform, when the bearer management message transmitted to the source base station is a bearer modification message, bearer modification according to type of the bearer modification.

13. The control entity of claim 12, wherein the processor is configured to:
    determine whether the target base station has complete the bearer modification, determine, when the target base station has completed the bearer modification, whether a Non-Access Stratum (NAS) message is received, deletes, when the target base station has not completed the bearer modification or the NAS message is not received, a bearer context associated with the bearer modification, determine, when the NAS message has been received, whether the bearer modification includes Quality of Service (QoS) modification, and re-perform, when the bearer modification includes the QoS modification, the bearer modification.

14. The control entity of claim 10, wherein the bearer list is generated based on the bearers included in the first list when the bearer management message transmitted to the source base station is a bearer release message.

15. The control entity of claim 14, wherein the processor is configured to release the bearers included in a list of bearers for which the target base station has failed securing resources among the bearers included in the bearer list.

16. A target base station for managing a session in handover of a terminal, the target base station comprising:

a transceiver configured to transmit and receive signals; and a processor configured to control the transceiver to receive, from a control entity, a handover request including a first list for bearers in a source base station for the terminal and a second list for bearers in the control entity for the terminal, generate a bearer list for bearers allowed for the handover and bearers for which securing resource has failed based on one of the first list and the second list, and transmit the bearer list to the control entity.

17. The target base station of claim 16, wherein the processor is configured to generate, when the second list corresponds to part of the first list, the bearer list based on the second list and generate, when the first list corresponds to part of the second list, the bearer list based on the first list.

* * * * *